United States Patent
Majd et al.

(10) Patent No.: US 6,680,948 B1
(45) Date of Patent: Jan. 20, 2004

(54) SYSTEM AND METHOD FOR TRANSMITTING PACKETS OVER A LONG-HAUL OPTICAL NETWORK

(75) Inventors: Mohammed Majd, Eatontown, NJ (US); William C. Marra, Brick, NJ (US); Richard W. Muise, Fair Haven, NJ (US); Peter K. Runge, Fair Haven, NJ (US); Patrick R. Trischitta, Holmdel, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 09/291,335

(22) Filed: Apr. 14, 1999

Related U.S. Application Data

(63) Continuation-in-part of application No. 09/241,702, filed on Feb. 2, 1999.

(51) Int. Cl.⁷ .............................. H04B 10/20; H04J 14/00
(52) U.S. Cl. ........................ 370/401; 370/466; 359/119; 359/135
(58) Field of Search ........................ 370/395.5, 395.51, 370/395.52, 395.53, 400, 401, 465, 466; 359/109, 113, 114, 115, 118, 119, 135; 385/100, 101, 14, 15, 16

(56) References Cited

U.S. PATENT DOCUMENTS

| | | | |
|---|---|---|---|
| 5,583,997 A | 12/1996 | Hart | 395/200 |
| 5,903,370 A * | 5/1999 | Johnson | 359/119 |
| 6,122,082 A * | 9/2000 | Fishman | 359/117 |
| 6,205,121 B1 * | 3/2001 | Heuer | 370/250 |
| 6,285,475 B1 * | 9/2001 | Fee | 359/100 |

FOREIGN PATENT DOCUMENTS

| | | |
|---|---|---|
| WO | WO 98 33299 | 7/1998 |

OTHER PUBLICATIONS

Manchester J. et al. "IP Over Sonet", IEEE Communications Magazine, US, IEEE Services Center, Piscataway, NJ vol. 36, No. 5, May 1, 1998, pp. 136–142, XP000752858, ISSN: 163–6804, p. 141, left hand column, line 25–38, p. 141, right hand column, line 7–14.

Andrew K. Bjerring; Bill St. Arnaud: "The Role of Optical Internets in the New Pyblic Network", Telecommunications Online, Retrieved from the internet <URL : http://www.telecoms-mag.com/issues/199901/tcs/state2.html, Sentences 21–28.

* cited by examiner

*Primary Examiner*—Ricky Ngo

(57) ABSTRACT

Packets are received at a first boundary node of a long haul optical communication network which may either interconnect originating and destination communication networks or form an integral part of a single end-to-end network. Packets are reclassified to reflect a higher priority of transmission than non-long haul bound packets, as by marking them with an indication of a modified priority level of transmission. Reclassified packets are transmitted over a long-haul optical link to a second boundary node. So that the modified priority level employed in the long-haul network may be understood by a destination network, packets arriving at the second boundary node may be re-mapped or reclassified to a value recognized as being of at least equal and, preferably, higher priority than that originally established by the originating network and/or first bounary node. Using a substantially equal priority value in the reclassification establishes at least a consistent, end-to-end quality of service for each packet that has traversed the long haul portion of a communications network. More efficient use of transmission resources is realized by associating a higher priority with packets that have traversed the long haul portion of the network, each packet increasing in value as it nears the ultimate destination. Essentially, the reclassification decreases the likelihood that a packet, having made such substantial progress as to have traversed the length of the long haul portion of the network, will be dropped prior to reaching its destination and require re-transmission.

24 Claims, 8 Drawing Sheets

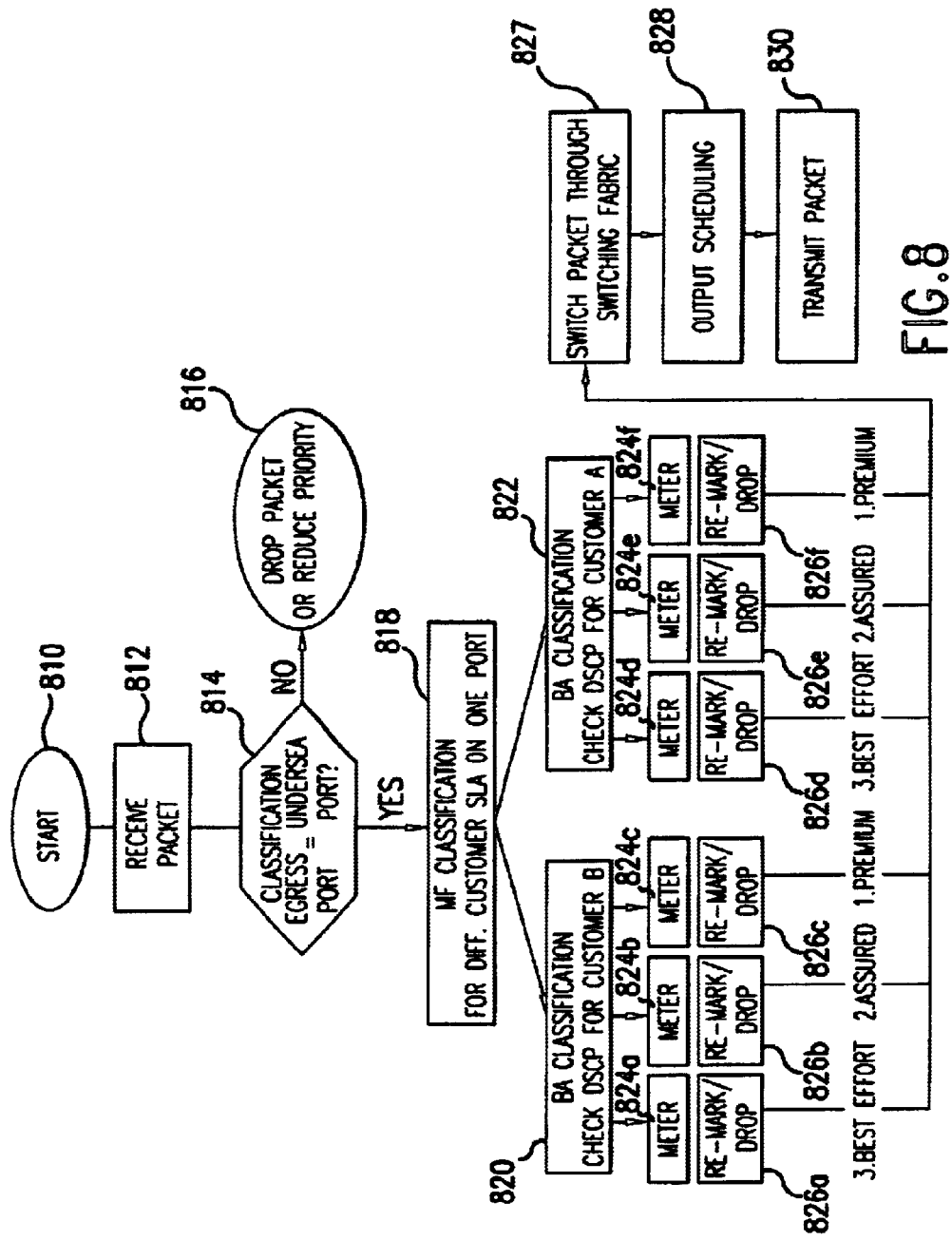

SYSTEM AND METHOD FOR TRANSMITTING PACKETS OVER A LONG-HAUL OPTICAL NETWORK

REFERENCE TO RELATED APPLICATIONS

This application is a Continuation-In-Part of U.S. patent application Ser. No. 09/241,702 filed on Feb. 2, 1999, entitled BOUNDARY ROUTER FOR INTERCONNECTING COMMUNICATION NETWORKS ACROSS A LONG-HAUL OPTICAL NETWORK and assigned to the assignee of the present application, Tyco Submarine Systems Ltd.

BACKGROUND OF THE INVENTION

1. Field of the Invention

The present invention relates generally to the optical transmission of information and, more particularly, to systems and techniques for improving transmission capabilities over long haul optical fiber transmission systems.

2. Description of the Background Art

Technologies used in long haul optical fiber communication networks, as an example, those employed in undersea systems, have changed radically over the last decade, driven primarily by the emergence of the erbium doped fiber amplifier (EDFA). EDFA's have enabled long, transoceanic systems to offer significantly higher capacities (tens to hundreds of gigabits per second per fiber pair) and much longer lengths in repeaterless systems. As this evolution has occurred, many nations have begun to appreciate the benefits of becoming totally involved with the burgeoning global economy, and have realized that such participation requires a fiber-optic communication to world markets. Finally, the explosive growth of packetized traffic driven by the Internet has touched off an accelerated need to plan and implement undersea optical fiber communication networks capable of handling the exchange of huge volumes of data over long distances.

For over a decade, transmission performance in telecommunications systems has been measured by the standards of the International Telecommunications Union (ITU). The network interface of greatest interest for undersea networks has been, since around 1990, the 155 Mbits/s optical and electrical signal interface of the synchronous digital hierarchy (SDH) synchronous transfer module defined by the ITU-T standards. Use of the SDH standards has simplified the interconnection of networks owned by different entities with equipment purchased from a multitude of vendors.

For packetized traffic transported by means of conventional undersea SDH transport techniques, it will be appreciated by those skilled in the art that protection against fiber breaks and cable faults may be achieved by incorporating redundant fiber links. In the long-haul network 10 depicted in FIG. 1, illustratively an undersea network incorporating spans of fiber exceeding 2000 km, redundancy is implemented using a single or double pair of fibers in a bi-directional line switched ring configuration. With continued reference to FIG. 1, it will be seen that long-haul network 10 incorporates four terminal or "landing" stations indicated generally at 12, 14, 16, and 18 respectively. Within each terminal station, SDH multiplexing/demultiplexing equipment 20 is provided for accepting and aggregating voice and data traffic from multiple subscribers (not shown). In accordance with a bandwidth provisioning contract made with the owner or operator of network 10, each such subscriber, illustratively an internet service provider is (ISP), supplies a stream of voice or data traffic at an agreed upon SDH transmission rate as, for example, 155 Mb/s, 622 Mb/s or 2.5 Gb/s.

In addition to the SDH multiplex/demultiplex equipment 20, the other terminal transmission equipment utilized in the conventional undersea communication system of FIG. 1 includes line terminating equipment or units (LTU's) 22, order wire equipment, switches and bridges, and monitoring and control circuitry. In combination, these devices have accommodated a number of architecture and networking options, including the most widely used add/drop line switched ring-protected configuration shown in FIG. 1. In the network of FIG. 1, the stations are interconnected by multiple fiber pairs, each fiber pair 24a–24d extending between respective LTUs. In the network topology of FIG. 1, which as will be recalled is chosen to achieve the high reliability generally demanded by subscribers, it will be readily appreciated by those skilled in the art that the distinction between "working" and "protection" fibers translates into only fifty percent of the nominally available transmission capacity being made available to subscribers for carrying transmission capacity that can be protected against failures.

Thus, while the reliability afforded by the ring topology is extremely high, it can not be flexibly reconfigured to match the needs of certain classes of subscribers, internet service providers (ISP's) for example, who would readily accept a lower level of redundancy in exchange for the ability to exchange more traffic over the long-haul "bottleneck" that may lie between two communication networks. Accordingly, there exists a need for a long haul optical fiber communications network capable of efficiently utilizing all of the available transmission capacity while still retaining the ability to supply each subscriber with a level of service flexibly tailored to that subscriber's expectations of reliability and available capacity.

SUMMARY OF THE INVENTION

The aforementioned deficiencies are addressed, and an advance is made in the art by a system and method for exchanging packets via a long-haul optical fiber communication network. Packets are received at a first boundary node of a long haul optical communication network which may either interconnect originating and destination communication networks or form an integral part of a single end-to-end network. Packets are reclassified to reflect a higher priority of transmission than non-long haul bound packets, as by marking them with an indication of a modified priority level of transmission. Reclassified packets are transmitted over a long-haul optical link to a second boundary node. So that the modified priority level employed in the long-haul network may be understood by a destination network, packets arriving at the second boundary node may be re-mapped or reclassified to a value recognized as being of at least equal and, preferably, higher priority than that originally established by the originating network and/or first boundary node. Using a substantially equal priority value in the reclassification establishes at least a consistent, end-to-end quality of service for each packet that has traversed the long haul portion of a communications network. More efficient use of transmission resources is realized by associating a higher priority with packets that have traversed the long haul portion of the network, each packet increasing in value as it nears the ultimate destination. Essentially, the reclassification decreases the likelihood that a packet, having made such substantial progress as to have traversed the length of the long haul portion of the network, will be dropped prior to reaching its destination and require re-transmission.

Advantageously, the priority classification scheme of the present invention also permits different classes of service to be defined. Long haul optical fiber communication networks, especially long haul undersea optical fiber communication networks, typically interface many different ISP domains with heterogeneous application requirements. Utilizing a packet classification scheme permits the long haul network owner or operator to not only accommodate these differing application requirements, but also to offer flexible pricing. By way of illustration, this may be achieved in an IP traffic carrying network by configuring the boundary router to evaluate a field in the packet header in conjunction with the source port address. By employing long haul boundary routers having such functionality, the owner or operator of the long haul network may, for example, sell a certain amount of capacity as "guaranteed" or "premium" class transmission services—corresponding to that portion of the network which can be reliably served (e.g., that capacity which would otherwise have been provided, for example, by the "working fiber" in the conventional topology of FIG. 1. Additional capacity may be sold to ISP networks and other data communication networks in accordance with an "assured services" contract for transmission services. The entire capacity may again be sold to still other data communication networks in accordance with a contract for "best effort" services. In this manner, service is pledged to those subscribers willing to pay, while others can contract for whatever capacity is left over when and as it becomes available.

At the first boundary node or router, packets arriving from the first data communication network are examined to determine the destination port address. Advantageously, most or all of the processing resources of the boundary router are reserved for traffic to be routed via the long-haul network to which the boundary router is connected. That is, segmentation is achieved between, on the one hand, the long haul optical fiber communication network itself, and on the other hand, the data communications networks connected thereto such, for example, as the first and second data communication networks. By way of illustration, this may be achieved in an IP traffic carrying network by assigning at least one of a plurality of interfaces of a source boundary router to at least the particular IP address associated with the second data communication network. Still others of the interfaces of the source boundary router may be assigned to respective IP addresses associated with other data communication networks with which interconnectivity is to be established by the long haul network. In such an illustrative arrangement, the aforementioned segmentation is achieved by configuring the router to examine the destination address of each packet received via the first plurality of interfaces and dropping those packets which do not match an IP address associated with one of the second plurality of interfaces. Alternatively, multiple queues may be established in which packets requiring routing via the long haul network are given preferential treatment over those which do not require such routing. It should be pointed out that the segmentation aspect of the present invention does not require the use of the plural groups of interfaces capable of transmitting at respectively different line rates. That is, although the inventive aspects of segmentation and efficient capacity utilization in a long haul boundary router are mutually desirable, they do not depend upon one another for their implementation.

BRIEF DESCRIPTION OF THE DRAWINGS

The various features and advantages of the invention will become apparent from the detailed description which follows and by reference to the accompanying drawings, in which:

FIG. 8 shows a packet routing process and method suitable for long haul boundary routers and which may be implemented by the boundary router of FIG. 6.

DETAILED DESCRIPTION OF THE INVENTION

Embodiments of the invention are discussed below with reference to FIGS. 2–8. However, those skilled in the art will readily appreciate that the detailed description given herein with respect to these figures is for explanatory purposes as the invention extends beyond these limited embodiments.

Figure 3:
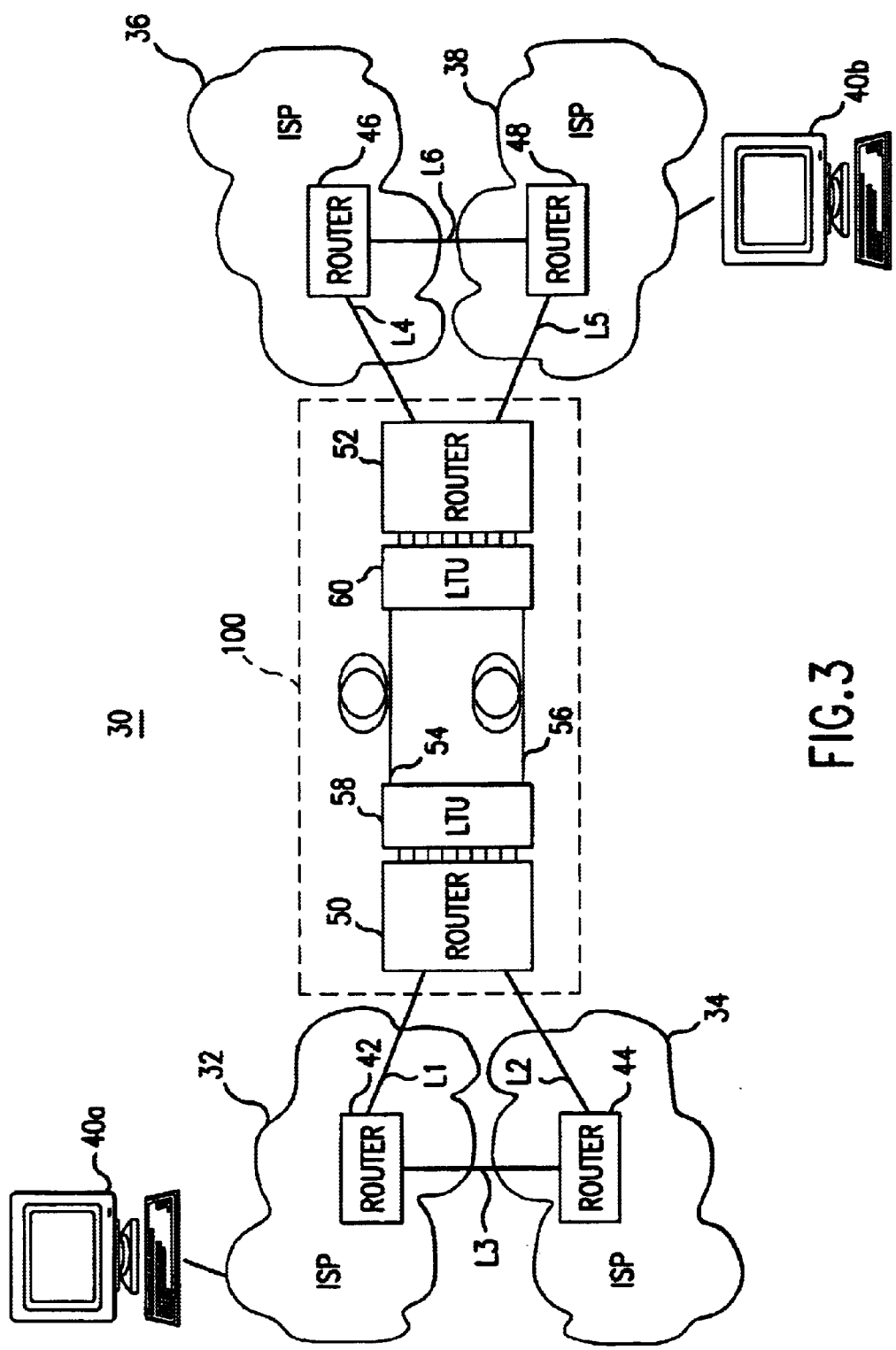
FIG. 3 is a diagrammatic view showing the interconnection of several data communication networks in a long haul optical optical fiber communication system employing boundary routers according to the present invention, which can be readily extended to more complex application.

In any event, and with initial reference to FIG. 3, there is depicted an illustrative communications network 30 comprising a long haul optical fiber communication network 100 interconnecting a first plurality of data communication networks including networks 32 and 34 and a second plurality of data communication networks including networks 36 and 38. In the illustrative network 30, each of the data communications networks is depicted as an internet service provider (ISP) network which, as will be readily appreciated by those skilled in the art, typically comprise a number of edge routers (not shown) directly connected to numerous individual workstations as workstations 40a and 40b. Each such workstation has, by virtue of the ISP edge router to which it is connected, an associated, and typically dynamically assigned, IP address.

Among the two illustrated ISP networks 32 and 34 included in the first plurality of data communication networks, link L3 between backbone routers 42 and 44 provides the shortest path for exchanging aggregated traffic between the respective groups of subscribers. Similarly, among the two illustrated ISP networks 36 and 38 included in the second plurality of data communication networks, link L6 between backbone routers 46 and 48 provides the shortest path for the exchange of traffic between their respective subscribers.

With continued reference to FIG. 3, it will be seen that long-haul connectivity between the first and second plurality of data communication networks is achieved via long haul boundary routers 50 and 52 of optical fiber communication network 100, by which boundary routers traffic is exchanged on the one end by links L1 and L2 associated with the first plurality of data communication networks and on the other end by links L4 and L5 associated with the second plurality of data communication networks. As will be explained in greater detail later, signals to be transmitted over fibers as fibers 54 and 56 are directed to a particular interface (not shown) of routers 50 and 52, respectively, and these are formatted, in a conventional manner by line terminating units (LTUs) 58 and 60, to obtain characteristics suitable for long-haul transmission.

Advantageously, the teachings of the present invention may be readily extended to more complex situations as, for example, those in which plural long haul optical fiber networks are involved. As exemplified in FIG. 3, additional long haul communication networks as network 101, including additional boundary routers as routers 50' and 52', may be added to collectively form a single, integrated network topology.

Figure 4:
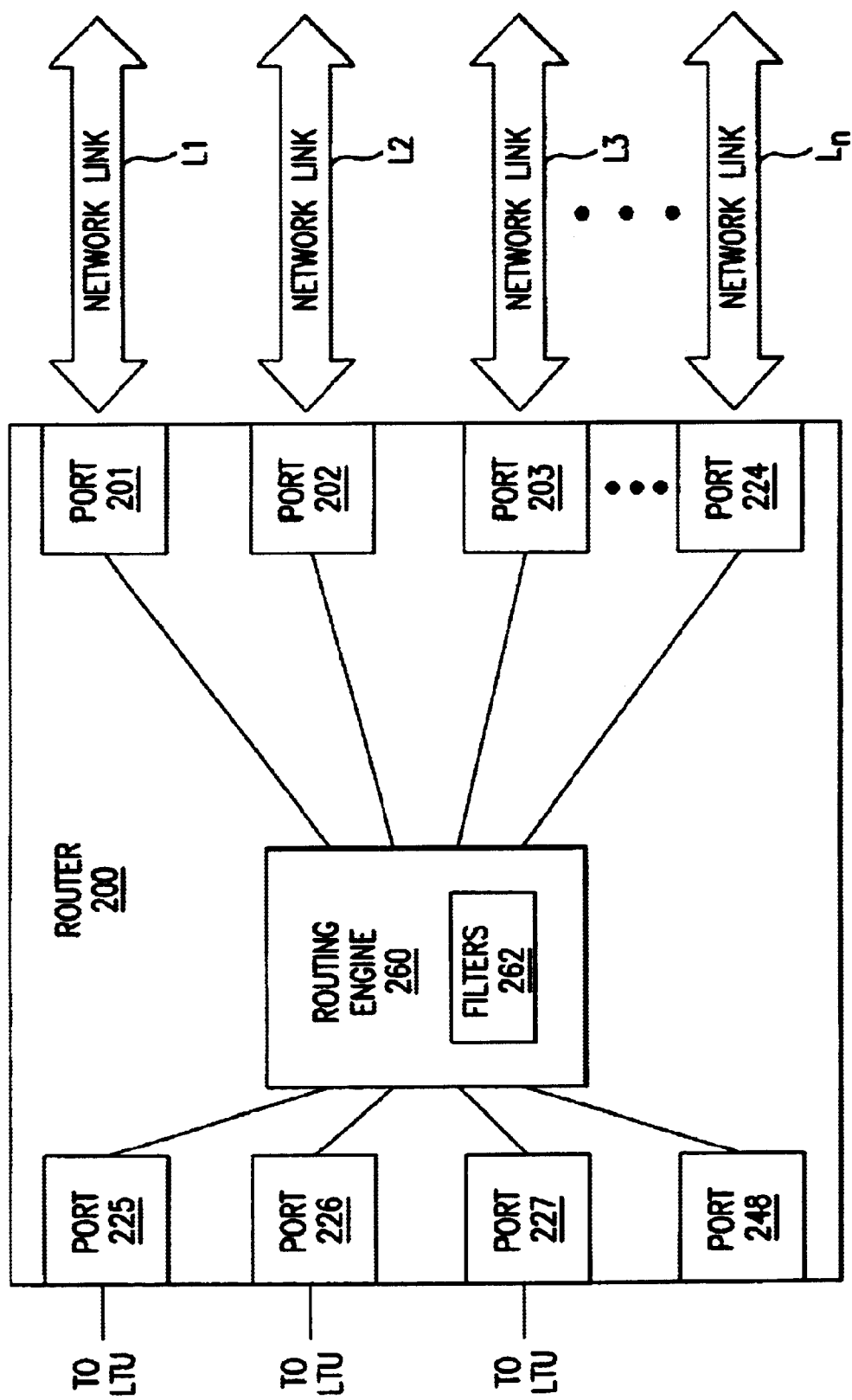
FIG. 4 is a block schematic diagram of a router constructed in accordance with an embodiment of the present invention.

With reference now to FIG. 4, there is shown in block diagram schematic form a router 200 constructed in accordance with an illustrative embodiment of the present invention. Router 200 generally comprises a plurality of interfaces or ports 201–224 that are each coupled to a corresponding network link (L1–Ln). Illustratively, network links may comprise links L1, L2, L4 and L5 of FIG. 3, as well as other links necessary for exchanging traffic between remote data communication networks via long haul network 100. Ports or interfaces assigned to such links, as ports 201–203 in FIG. 4 are operable to transmit and receive at the line rate corresponding to the bandwidth provisioning contract made with that subscriber. Illustratively, one subscriber such as an ISP network may have an agreement with the owner or operator of network 100 to accommodate 10 Gbps. Another subscribing ISP network may have a commitment specifying a rate of 2.5 Gbps or other committed rate. Additionally, network links are reserved for interconnecting long haul boundary routers as router 200 with one another (as routers 50 and 52 in FIG. 3) to thereby direct traffic over the fiber span comprising the long haul portion of network 100. In accordance with the undersea and terrestrial line rate decoupling feature of the present invention, ports or interfaces assigned to the latter type of links, as ports 225–227 are operable to transmit and receive at a line rate which is either greater or lower than the line rate corresponding to the bandwidth provisioning contract made with a subscribing data communication network, depending upon the particular characteristics of the long haul network.

Figure 1:
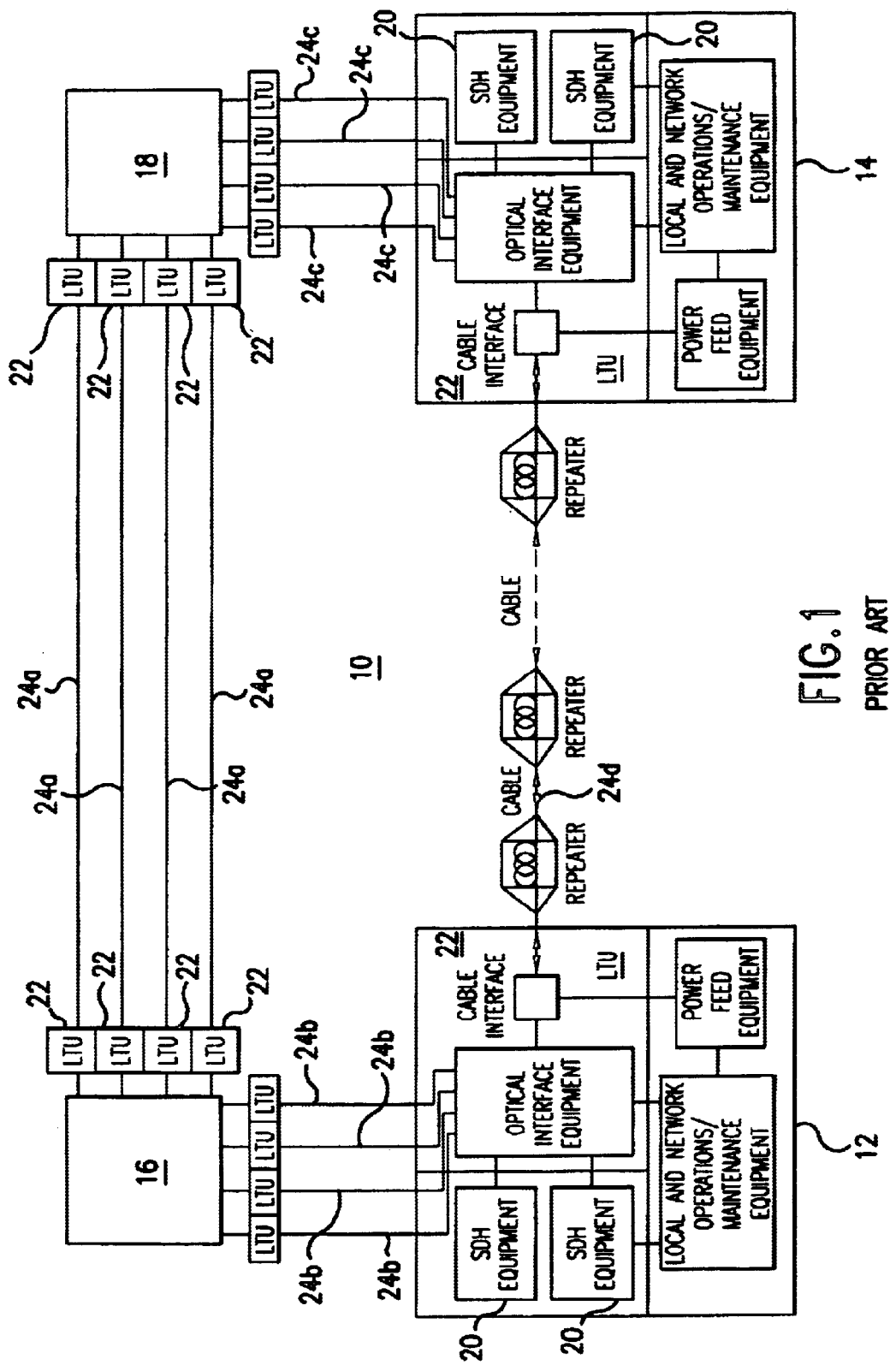
FIG. 1 depicts a conventional implementation of a long-haul optical communication network in which SDH add/drop multiplexers are deployed in a bidirectional line switched rings, with optically amplified links extending between terminal nodes.
Figure 2:
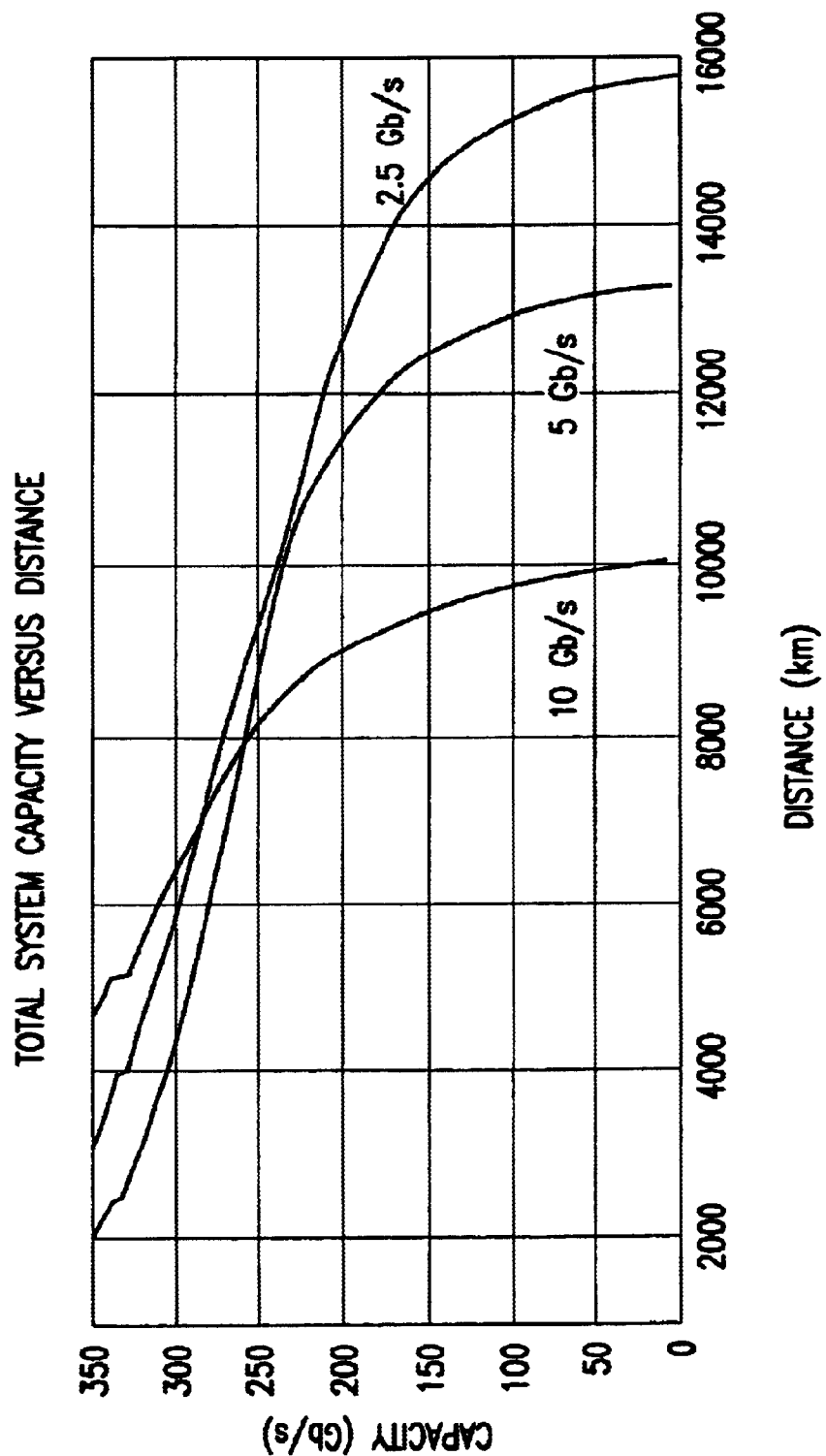
FIG. 2 depicts a graphical representation of the relationship between total system capacity and transmission distance in an illustrative long haul optical fiber communication system over which a plurality of wavelength division multiplexed channels are transmitted.

With reference now to FIG. 2, it will be apparent to those skilled in the art that overall transmission capacity in a long haul network depends on such variables as the average launched signal power, transmission wavelength, the number of channels (channel spacing), transmission line characteristics, and transmission distance. The graphical relationship presented in FIG. 2 is based upon a 980 nm pump wavelength system in which several (the number changing from cases to case) wavelength division multiplexed channels distributed over a 20 nm band around 1550 nm are available for modulation. As can be seen in the specific example of FIG. 2, for the system in which optical signals modulated with data are to be transmitted a distance of 9,000 km, a modulation rate of 5 Gb/s provides the greatest overall utilization of available transmission line capacity (i.e., approximately 275 Gb/s). Applying the teachings of the present invention to a long haul network employing such fiber spans, the ports of boundary router 200 receiving and transmitting signals via the line terminating equipment (LTUs) are configured to do so at the line rate of 5 Gb/s or as close thereto as practicable. By way of illustration and reference to both FIGS. 3 and 4, if an OC-192 stream at a line rate of 10 Gb/s arrives at port 201 from ISP network 12 via link L1, the stream is separated by long haul boundary router 200 and sent over two separate wavelength channels, each modulated at a rate of 5 Gb/s, by long haul network 30 via two ports, illustratively ports 225 and 226, while maintaining the integrity of individual flows. If, on the other hand, a first OC-48 stream at a line rate of 2.5 Gb/s arrives at port 202 from ISP network 14 via link L2 and a second OC-48 stream at a line rate of 2.5 Gb/s arrives at port 203 from ISP network 16 via link L3, then they may be combined into one 5 Gb/s signal by long haul boundary router 200—that is, both streams may supply packets to a single port, illustratively 227, of router 200.

The interoperability of long haul boundary router 200 with the existing routers in a packet switching or routing network is deemed by the inventors herein to constitute an especially advantageous aspect of the present invention. That is, it is recognized that realization of the illustrative network topology depicted in FIG. 3 requires long haul boundary routers 50 and 52 (and others implementing the functionality of router 200 in FIG. 4), to advertise their availability to routers such as ISP backbone routers 42–48 (as well as to others collectively comprising the non-long haul portion thereof) and to exchange packets therebetween. As will hereinafter be discussed in detail, such interoperability presents a particular set of opportunities to the owner or operator of an undersea optical fiber communication network.

Figure 5:
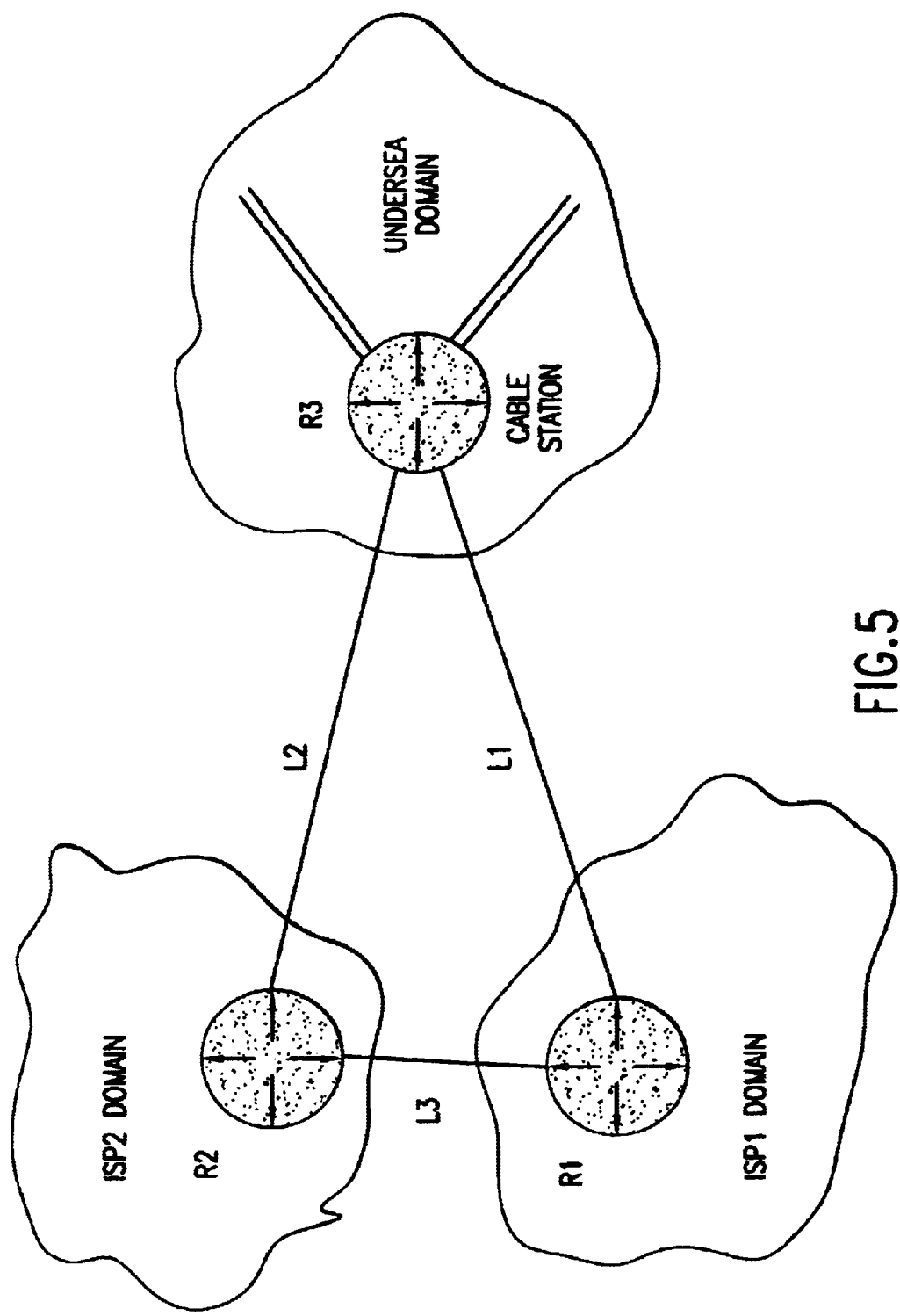
FIG. 5 is a simplified view depicting the interconnection of a single boundary router to multiple ISP networks, the boundary router forming part of a cable landing station to provide such ISP networks with access to an undersea long haul network.

With reference now to FIG. 5, there is exemplified the interconnection of a single boundary router to multiple ISP networks as ISPL and ISP2, the boundary router R3 forming, in accordance with an especially preferred implementation of the invention, part of a cable landing station providing the ISPs with access to an undersea long-hual optical fiber communication network. In the undersea boundary router R3, undersea or "trunk" ports (those routing traffic to and from the optical links of the undersea network) are distinguished from terrestrial or "access" ports (those routing traffic to and from the ISP networks ISP 1 and ISP2. The access ports of router R3 are connected via links L1 and L2 to routers R1 and R2, in the network backbones of ISP1 and ISP2 domains, respectively. R1 and R2 are themselves directly interconnected via another link, L3.

Before links L1 and L2 and boundary router R3 are added to the illustrative, simplified internetworking topology of FIG. 5, the routing tables in R1 and R2 contain information on only one route (L3) connecting the ISP1 and ISP2 domains. When router R3 and links L1 and L2 are introduced, router R3 updates its own routing table to reflect its relationship with the adjacent backbone routers and it advertises its availability to provide a second route between ISP1 and ISP2. In the event of a break or congestion in L3, indirect exchange of packets between ISP1 and ISP2 might be performed. Such utilization, if not managed in an appropriate way, might burden the undersea boundary router R3 with the terrestrial traffic between R1 and R2 and, in so doing, substantially reduce the rate at which traffic is exchanged with the links of the long haul undersea network.

To avoid burdening undersea boundary routers of the type contemplated by the present invention with excessive amounts of terrestrial traffic, then, a suitable technique must be employed to ensure the processing resources of the boundary router are put to their highest and best use. The inventors herein propose arrangements in which a distinction is made between undersea and access ports of an undersea boundary router and in which a priority or quality of service (QoS) classification scheme is used to preferentially allocate traffic between the access ports and undersea ports. Specifically, and as will be described in more detail later, boundary routers configured for interconnection to an undersea optical fiber communication network in accordance with an especially preferred embodiment of the present invention include a filtering functionality that is sufficient to prevent or limit the ability of non long-haul (e.g., non-undersea) traffic from consuming processing resources essential to maintaining efficient traffic flow through the long haul network. The advantages of such a capability will be evident when considering the event of a failure in link L1 of FIG. 5 that prevents the direct flow of traffic from terrestrial router R1 to undersea boundary router R3. In such event, link L3 provides a diversely routed path to link L2, and router R2 throttles and prioritizes the traffic—dumping the terrestrial or non long-haul traffic, if necessary, in favor of the long-haul traffic. As indicated in FIG. 3, such capability might be further expanded to divert traffic from long haul network 100 to long haul network 101.

Returning briefly to FIG. 4, and with reference also to FIGS. 6A and 6B, an overview of the way in which a long haul boundary router according to the present invention may achieve the aforementioned aggregating/separating and preferential bandwidth allocation functionalities will now be described. As seen in FIG. 4, a routing engine 260 of boundary router 200 is coupled to each of the ports 201–248 for processing and forwarding packets received from the ports using the included filters 262. A routing engine typically comprises a central processing unit (CPU) (not shown), a packet memory, and a system memory wherein the system memory typically stores applications programs that provide filtering functions. Thus filters 262 may actually be software entries stored in the main memory. Alternatively, filters may be provided using hardware. Before describing the filtering process in detail, a brief discussion of the packet attributes that may be used as criteria for performing filtering actions in accordance with various aspects of the invention is warranted.

Figure 6A:
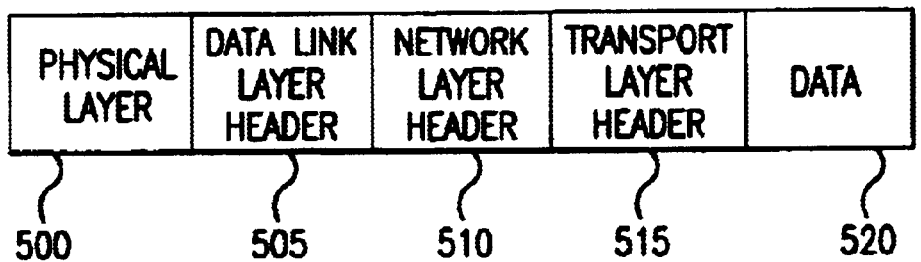
FIG. 6A shows a prior art format for a data packet.
Figure 6B:
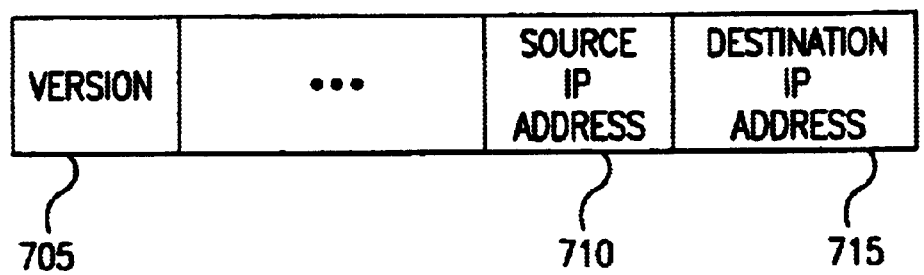
FIG. 6B shows the format of a network layer header.

FIG. 6A generally shows a typical data packet as comprising a physical media layer 501, a datalink layer header 505, a network layer header 510, a transport layer header 515, and the data or payload of the packet 520. All the headers are generically referred to based on the layer to which they correspond because there are multiple types of layer specific protocols. For example, ethernet, token ring, and FDDI are examples of datalink layer protocols, and each includes a Media Access Control (MAC) sublayer protocol that specifies a source address and a destination address. FIG. 6B shows a portion of a network layer header as comprising a multiplicity of fields that includes a version field 705, and a source IP address field 710, and a destination IP address 715. The network layer header of FIG. 5B is for a network that implements the IP network layer protocol.

In a typical filtering operation, the routing engine utilizes the filter to compare the attributes of the received packet to the criteria specified by the filter. The criteria used to filter a packet may comprise any attribute of the received packet. For example, common criteria include source IP address, destination IP address, and source or destination port address. Boundary routers in accordance with the invention are provided with a traffic filter that ensures that packets destined for the long-haul network 30 are aggregated, separated, or otherwise routed to selected ports of the router for ultimate processing by the line terminating equipment. Moreover, in accordance with an especially preferred embodiment of the invention, packets to be exchanged between ISP networks or routers which are on only one side of long haul network 30 are treated with lowest priority or dropped to preserve processing resources. According to this basic example, the only criterion required is the destination port address (by which the router distinguishes between an "access" port and an "undersea" port) which can be derived from the packet header.

An additional field which may be employed is the so-called Differentiated Services Code Point (DSCP) field, which field may be employed by a data communication network to indicate a hierarchy of preferential treatment to be accorded packets originating from that network. Although the field size is limited, a useful number of classes may be defined—giving the internet service provider an opportunity to create multiple service classes. An illustrative proposal suggests that a "premium services" class may be established for applications requiring low delay and low jitter, an "assured services" class may be established for adaptive real time applications requiring reliable but not fixed delay bounds, and a "best effort service", corresponding to the current implementation of the internet, may be established in which traffic is forwarded as quickly as possible with no guarantee for actual or timely delivery. A particular requirement of an undersea boundary router according to the present invention is that it must interconnect different ISP domains, with correspondingly diverse applications. Advantageously, the use of a QoS classification scheme permits both service differentiation—by which it is possible to accommodate heterogeneous application requirements and ISP expectations,—and differential pricing of undersea internet service (as contrasted with purely terrestrial internet traffic).

Figure 7:
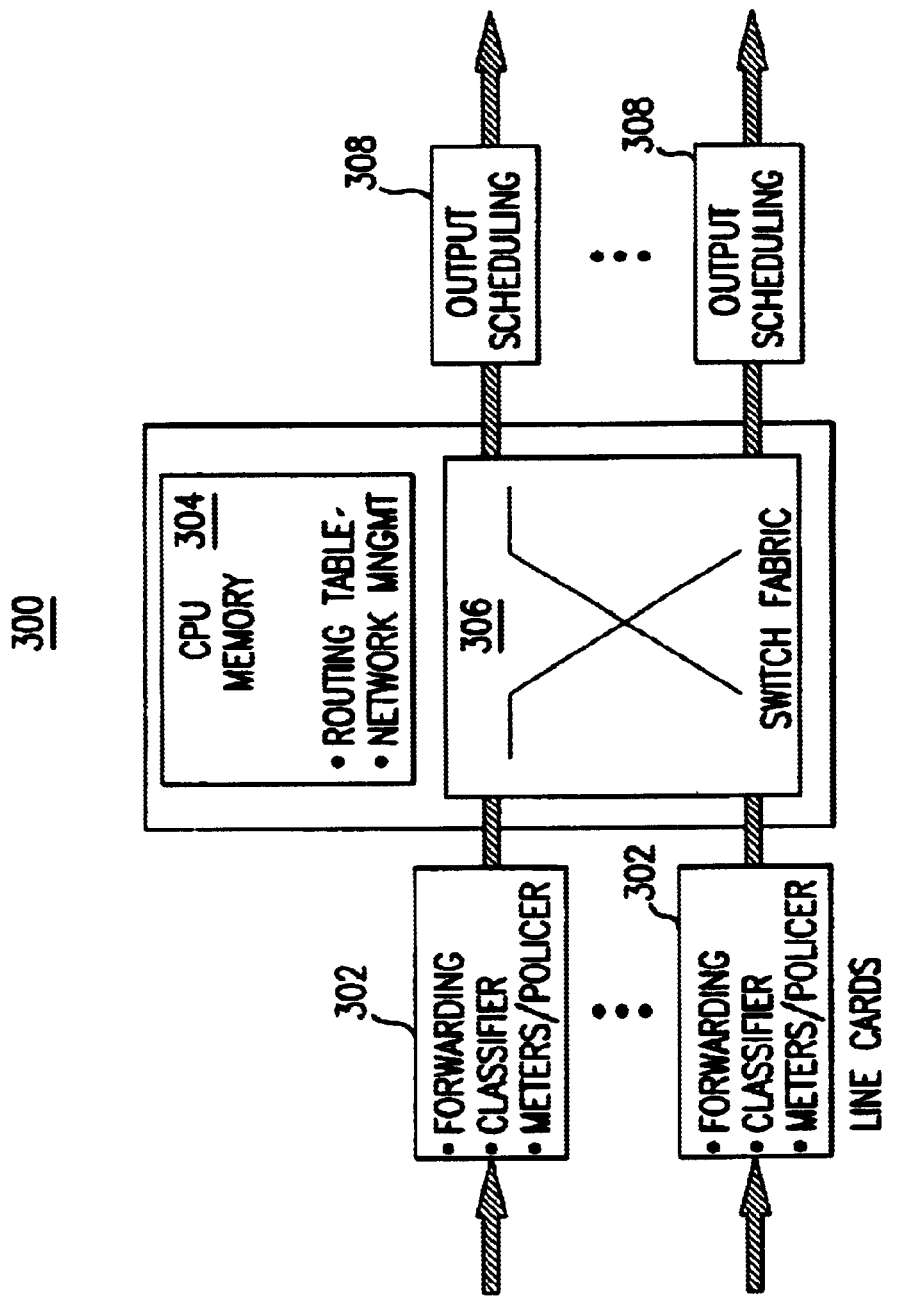
FIG. 7 is a block schematic diagram of a router constructed in accordance with a modified embodiment of the present invention.

FIG. 7 is a schematic block diagram depicting a boundary router 300 of the present invention especially suited for the application depicted in FIG. 5 and especially intended for the routing of IP traffic. Generally, a service level agreement (SLA) between the network operating the boundary router and the customer determines the traffic conditioning terms for each specific customer. The traffic conditioning functions such as classification, metering, re-marking, and policing are applied in policing module 302 at the ingress ports 302 of router 300. In general, installing a SLA for each of the many customers that are connected to each ingress port would lead to the need to enforce a substantial number of SLA's on a single port. For simplification of SLA enforcement and management, each individual undersea port of the boundary router 300 can be allocated to a corresponding customers or one interface can be shared among several subscribing ISPs having the same or similar QoS expectations and traffic. Such an arrangement would allow a single SLA to be applied at each ingress port—making traffic conditioning operations less processing intensive. As will be described in greater detail in connection with FIG. 8, compliant packets are advanced under the direction of the routing engine 304 through the routing fabric 306 to an output scheduling module. Those packets bound for the undersea network are queued in an output scheduler according to the QoS parameters and output to the LTU (not shown) for subsequent processing.

With reference now to FIG. 8, it will be assumed that multiple networks, each with potentially dissimilar expectations and QoS requirements share the same interface ports. Packets enter the process at block 812,. Packets are received at block 812, whereupon the process proceeds to a step of multi-field (MF) classification (block 814) which may, for example, comprise an extensive classification based on the content of source address, destination address, DSCP field, source and destination port number. In an undersea boundary router according to the present invention, MF classification is first used to preferentially direct the traffic between terrestrial ports and undersea ports and to drop or reduce the priority of the local terrestrial traffic block 816. According to the illustrative embodiment of FIGS. 7 and 8, MF classification proceeds further in a step of separating different customers' traffic to enable separate SLA enforcement if traffic from multiple customers with various SLAs is submitted to the same port or interface (block 818).

Packets then proceed through a "Behavior-Aggregate" (BA) classification (in this example for each different SLA associated with the destination port) (block 820 or 822). The Behavior Aggregate process which is a process of sorting packets based only on the content of the differentiated services field (DSCP) in the IP header. By marking DSCP of packets differently, several diff-serv classes can be created. When a packet crosses the border between two domains, its DSCP field may be re-marked according to the SLA between the two domains. The DSCP in packets of different flows may be marked identically resulting in identical service classes across many flows. In any event, once the DSCP field information is ascertained, metering is performed for each class of packet (blocks 824a–824f). If a subscribing network is exceeding its SLA for a given class of traffic (three priority classes, premium, assured and best effort are depicted in the illustrative process of FIG. 8), re-marking or dropping is performed in blocks 826a–826f. For example, if some packets are not considered as being "in-profile", then their DSCP fields are re-marked to a lower class or they are completely dropped depending on the terms of the SLA. After switching packets through the switch fabric (block 827) to the output ports, the packet output scheduler schedules the packet in one of the different classes to meet its QoS requirements (block 828) and the packet is transmitted via the undersea network (block 830).

It will be readily appreciated by those skilled in the art that a number of modifications and variations are possible. For example, if a received packet does not requires routing via the fiber spans of a long-haul network 30 (i.e., as for an exchange of data traffic between boundary routers 50 and 52, then the router filtering scheme could be configured to drop the packet. Alternatively, its DSCP field could be remarked to the lowest class of traffic in the QoS hierarchy. For those packets which are routed across an undersea network, a unique feature of the invention herein is that a consistent end to end quality of service can be provided to network subscribers. In addition to the process steps described above, this further includes a step of remarking the packet at the destination boundary router based. Specifically, the destination boundary router (e.g., boundary router 52 in FIG. 3) may be configured to examine packets received from the source boundary router (e.g. boundary router 50), ascertain the DSCP field or other indicia of QoS preference in the packet) and re-mark the packet, before passing it to the destination backbone router (e.g. router 48 of FIG. 3), to signify a request for the closest QoS level available in the destination network. A default configuration may be to convert all undersea routed packets to the highest priority in the destination network. Such a configuration advantageously conserves transmission resources by decreasing the likelihood that a packet, having made such substantial progress as to have essentially traversed the entirety of the long haul optical communication network, will be dropped prior to reaching its destination and require re-transmission.

In view of the foregoing examples and detailed description, it should be evident that substantial flexibility is given to the owner/operator of a long-haul network such as an undersea optical fiber communication network to implement customized arrangements with many different network service providers despite wide variations in their service requirements.

What is claimed is:

1. In a long-haul optical fiber communication network including a plurality of optical links each having optical amplifiers disposed at intermediate locations therealong, a boundary router for exchanging packets addressed to a destination requiring transmission over one of the optical links, comprising:

a first interface for exchanging packets with one of an originating and a destination communication network, wherein said packets received at said first interface are identified by a priority level corresponding to a request for transmission on a best effort basis within at least one of the originating and destination communication networks; and a second interface for exchanging packets, said packets suitable for optical transmission, with an optical link of said long-haul optical fiber communication network;
   wherein said boundary router is operative to associate a higher level of priority with packets transmitted or to be transmitted over the long haul optical fiber communication network than packets not to be transmitted over the long haul optical fiber communication network.

2. The boundary router of claim 1, wherein said boundary router is operative to associate the higher level of priority with a packet prior to supplying the packet over an optical link of the long haul network.

3. A long haul optical fiber communication system, comprising
   a first boundary router;
   a second boundary router; and
   at least one long-haul optical fiber communication link extending between said first boundary router and said second boundary router, each said long-haul optical fiber communication link having a plurality of optical amplifiers disposed therealong;
   wherein, each of said boundary routers comprises:
      a first interface for exchanging packets with one of an originating and a destination communication network, wherein said packets received at said first interface are identified by a priority level corresponding to a request for transmission on a best effort basis within at least one of the originating and destination communication networks; and
      a second interface for exchanging packets with said at least one optical fiber link, said packets being suitable for optical transmission, wherein each said boundary router is operative to associate a higher level of priority with packets transmitted or to be transmitted over the long haul optical fiber communication network than packets not to be transmitted over the long haul optical fiber communication network.

4. The system of claim 3, wherein said higher level of priority corresponds to a request, within at least one of the originating and destination communication networks, for transmission on a preferential basis over packets not so identified.

5. The system of claim 4, wherein each said boundary router is operative to associate the higher level of priority with a packet prior to supplying the packet over said at least one long haul optical fiber communication link.

6. The boundary router of claim 4, wherein each said boundary router is operative to associate the higher level of priority with a packet after the packet has traversed an optical link of the long haul network.

7. The system of claim 3, wherein said first and second boundary routers are operative to receive packets marked with an indication of a priority level of transmission pre-established by the first and second communication networks, respectively.

8. The system of claim 7, wherein said first and second boundary routers are further operative to receive, from the long haul optical fiber communication link, packets marked with a modified priority level of transmission and to reclassify such packets by marking with a priority level corresponding to at least the first priority level of transmission.

9. A method of transmitting packets, received from a first communication network, over a long haul optical fiber communications network to a second communication network, said method comprising the steps of:
 receiving, at a first boundary node of the long haul optical fiber communication network, packets marked with an indication of a priority level of transmission pre-established by the first communication network;
 reclassifying at least some received packets, said reclassifying step including marking packets received at the first boundary node with an indication of a modified priority level of transmission; and
 transmitting at least some of the packets received during the receiving step over the long haul optical fiber communication network to a second boundary node.

10. The method of claim 9, wherein said step of transmitting is performed after said step of reclassifying.

11. The method of claim 9, wherein said reclassifying step is a first reclassifying step, said method further including a second reclassifying step wherein packets received at the second boundary node are marked with an indication of a priority level of transmission corresponding to at least said pre-established priority level of transmission.

12. The method of claim 11, wherein the level of transmission priority established by the first communications network for packets arriving at the first boundary node is a low level of transmission priority and wherein the level of transmission priority established during said second step of reclassifying is a higher level of transmission priority within said second communications network.

13. The method of claim 9, wherein said step of receiving is a first receiving step, further including a second step of receiving, at the first boundary node, packets from the first communication network marked with an indication of a second priority level different from the priority level of those received in the first receiving step.

14. The method of claim 13, wherein at least some of the packets received during the second step of receiving are dropped by the first boundary node in preference to packets received during the first step of receiving when transmission capacity available to the first communication network is fully utilized.

15. The method of claim 13, wherein said step of reclassifying includes marking at least some packets bearing an indication of the second priority level of transmission established by the first communication network with an indication of said modified priority level of transmission.

16. The method of claim 13, wherein said step of reclassifying includes marking at least some packets bearing an indication of the second priority level of transmission established by the first communication network with an indication of a priority level of transmission different than said modified priority level of transmission.

17. The method of claim 9, wherein multiple levels of priority are pre-established by the first communication network and wherein the reclassifying step comprises assigning, from among a smaller number of priority levels available in the long haul network, a respective level of transmission priority to each packet arriving at the first boundary network.

18. The method of claim 17, wherein said reclassifying step is a first reclassifying step, said method further including a second reclassifying step wherein packets received at the second boundary node are marked with an indication of a priority level of transmission corresponding to at least said pre-established priority level of transmission.

19. In a communication network including a long haul optical fiber communication system comprising a first boundary router, a second boundary router, and at least one long-haul optical fiber communication link extending between the first and second boundary routers, each said long-haul optical fiber communication link having a plurality of optical amplifiers disposed therealong, a method of exchanging packets between a source and destination, comprising the steps of:
 receiving, at the first boundary router, a packet to be transmitted over the at least one long haul optical fiber communication link;
 transmitting a packet received during the receiving step via the long haul optical fiber communication link to the second boundary router;
 directing packets received from the long haul optical fiber communication link toward a corresponding destination address; and
 marking each packet, prior to said step of directing, with an indication of at least an equivalent priority in comparison to at least some packets not requiring transmission over the at least one long haul optical fiber communication link, whereby at least a consistent end-to-end quality of service is achieved for packets traversing the long haul optical fiber communication system.

20. The method of claim 19, wherein said marking step is performed prior to said transmitting step.

21. The method of claim 19, wherein packets marked with an initial priority level, representative of a request for best efforts transmission within an originating communication network, are received during the receiving step, and wherein only packets to be directed over the at least one optical fiber communication link are marked, during said marking step, with an indication corresponding to a higher level of priority in a destination network containing the destination address.

22. In a long-haul optical fiber communication network including a plurality of optical links each having optical amplifiers disposed at intermediate locations therealong, a boundary router for exchanging packets addressed to a destination requiring transmission over one of the optical links, comprising:
 a first interface for exchanging packets with one of an originating and a destination communication network; and
 a second interface for exchanging packets, said packets being suitable for optical transmission, with an optical link of said long-haul optical fiber communication network, wherein said boundary router is operative to associate a higher level of priority with packets transmitted or to be transmitted over the long haul optical fiber communication network than packets not to be transmitted over the long haul optical fiber communication network, said higher level of priority corresponds to a request, within at least one of the originating and destination communication networks, for transmission on a preferential basis over packets not so identified.

23. The boundary router of claim 22, wherein said boundary router is operative to associate the higher level of priority with a packet after the packet has traversed an optical link of the long haul network.

24. A long haul optical fiber communication system, comprising a first boundary router;

a second boundary router; and at least one long-haul optical fiber communication link extending between said first boundary router and said second boundary router, each said long-haul optical fiber communication link having a plurality of optical amplifiers disposed therealong;

wherein, each of said boundary routers includes a first interface for exchanging packets with one of an originating and a destination communication network; and a second interface for exchanging packets with said at least one optical fiber link, said packets being suitable for optical transmission, wherein each said boundary router is operative to associate a higher level of priority with packets transmitted or to be transmitted over the long haul optical fiber communication network than packets not to be transmitted over the long haul optical fiber communication network, wherein said higher level of priority corresponds to a request, within at least one of the originating and destination communication networks, for transmission on a preferential basis over packets not so identified.

* * * * *

UNITED STATES PATENT AND TRADEMARK OFFICE
CERTIFICATE OF CORRECTION

PATENT NO. : 6,680,948 B1  Page 1 of 1
DATED : January 20, 2004
INVENTOR(S) : Mohammed Majd et al.

It is certified that error appears in the above-identified patent and that said Letters Patent is hereby corrected as shown below:

Column 1,
Lines 12 and 13, delete "Tyco Submarine Systems Ltd." and insert -- Tyco Telecommunications (US) Inc. --;
Line 67, delete "is";

Column 2,
Line 25, delete "can not" and insert -- cannot --.

Column 4,
Line 13, delete "optical", second occurrence;

Column 6,
Line 36, delete "ISPL" and insert -- ISP1 --;
Line 39, delete "long-hual" and insert -- long-haul --;
Line 44, delete "ISP 1" and insert -- ISP1 --;

Column 8,
Line 67, delete the ","; and

Column 9,
Line 43, delete "requires" and insert -- require --.

Signed and Sealed this

Eleventh Day of May, 2004

JON W. DUDAS
*Acting Director of the United States Patent and Trademark Office*